United States Patent [19]
Frankel et al.

[11] Patent Number: 6,060,532
[45] Date of Patent: May 9, 2000

[54] MULTI-STAGED BINDER FOR USE IN ELASTOMERIC COATINGS, CAULKS AND SEALANTS

[75] Inventors: Lawrence Stephen Frankel, Jenkintown; William Stellwagen, Jr., Trevose; John Van Curen, Hatboro; Donald Alfred Winey, Warminster, all of Pa.

[73] Assignee: Rohm and Haas Company, Philadelphia, Pa.

[21] Appl. No.: 09/004,662

[22] Filed: Jan. 8, 1998

Related U.S. Application Data

[63] Continuation of application No. 07/725,714, Jul. 3, 1991, abandoned.

[51] Int. Cl.[7] ................................. C08F 2/46; C08J 3/28
[52] U.S. Cl. ............................. 522/46; 522/109; 522/110
[58] Field of Search ............................... 522/46, 109, 110

[56] References Cited

U.S. PATENT DOCUMENTS

| | | | |
|---|---|---|---|
| 3,429,852 | 2/1969 | Skoultchi | 260/47 |
| 3,745,196 | 7/1973 | Lane et al. | 260/881 |
| 4,107,120 | 8/1978 | Plamondon et al. | 260/885 |
| 4,148,987 | 4/1979 | Winey | 526/316 |
| 4,814,373 | 3/1989 | Frankel et al. | 524/460 |
| 5,075,380 | 12/1991 | Lindner et al. | 525/178 |

FOREIGN PATENT DOCUMENTS

| | | |
|---|---|---|
| 10000 | 4/1980 | European Pat. Off. . |
| 321830 | 6/1989 | European Pat. Off. . |
| 387664 | 9/1990 | European Pat. Off. . |
| 417568 | 3/1991 | European Pat. Off. . |
| 56-161484 | 12/1981 | Japan . |

OTHER PUBLICATIONS

Roffey "Photopolymerization" 1982 Wiley & Sons pp. 117, 118, 119.

*Primary Examiner*—Mark Chapman
*Attorney, Agent, or Firm*—Ronald D. Bakule

[57] ABSTRACT

A method for using a thermoplastic elastomeric composition which contains a multi-staged emulsion polymer binder is provided. An elastomeric composition which contains a multi-staged emulsion polymer binder and a photosensitive composition and a method for using the elastomeric composition in elastomeric coatings, caulks, or sealants is also provided.

6 Claims, No Drawings

MULTI-STAGED BINDER FOR USE IN ELASTOMERIC COATINGS, CAULKS AND SEALANTS

This application is a continuation of prior application Ser. No. 07/725,714 filed Jul. 3, 1991 now abandoned.

FIELD OF THE INVENTION

This invention relates to a method for using a thermoplastic elastomeric composition for applications where low temperature flexibility and dirt pick up resistance are required. The thermoplastic elastomeric composition, which contains a multi-staged emulsion polymer binder, is useful in mastic coatings, caulks, and sealants. Elastomeric compositions containing a photosensitive composition and a method for using the elastomeric compositions are also provided.

BACKGROUND OF THE INVENTION

Protective and decorative elastomeric compositions for application onto flexible or extensible substrates or for bridging or filling gaps between independently movable substrates such as, for example, mastic coatings, caulks, and sealants require low temperature flexibility due to the need for the composition to withstand stresses such as elongation at low temperatures. However, the same compositions require antithetical properties such as, for example, high tensile strength, low surface tack, and low dirt pickup, at high temperatures. While compositions containing an aqueous dispersion of water-insoluble polymer with a glass transition temperature ($T_g$) lower than the temperature at which the polymer is used are advantageously used for many applications, dried low $T_g$ polymer-based compositions are too tacky for many applications and readily bind environmental dirt particles. On the other hand, polymers with a $T_g$ higher than the temperature at which the polymer is used disadvantageously require higher levels of polluting volatile organic coalescing aids to effect film formation and provide dried compositions with insufficient low temperature flexibility.

There is a need for a method for using an elastomeric composition for coatings, caulks, and sealants where low temperature flexibility and dirt pick up resistance are required.

DESCRIPTION OF THE PRIOR ART

U.S. Pat. No. 3,745,196 discloses acrylic elastomers prepared by a poly-stage polymerization procedure in which a first stage polymer is at least partially encapsulated with subsequent polymer. The first stage polymer includes at least 50% by weight monomeric acrylate which when homopolymerized produces a homopolymer having a $T_g$ below about −35° C., optionally with minor amounts of other alkyl acrylates and substituted alkyl acrylates, and generally with one or more curing site monomers. The final-stage polymer comprises at least 60% by weight ethyl acrylate and/or methyl acrylate, from 0 to 40% of an acrylic nitrile, and, preferably, a curing site monomer. Coagulating, compounding, and vulcanization of the elastomers is also disclosed. U.S. Pat. No. 3,745,196 does not disclose a method for using a thermoplastic elastomeric composition for applications where low temperature flexibility and dirt pickup resistance are required nor an elastomeric composition incorporating a photosensitive composition and a method for using the elastomeric composition.

U.S. Pat. No. 4,107,120 discloses an acrylic emulsion polymer which imparts improved low temperature properties to polymer-treated textiles. The acrylic emulsion polymer particles have a core-shell structure. The core composition contains a latent crosslinker together with an active crosslinker or graftlinker and has a $T_g$ of −20° C. or lower. The shell polymer composition contains a latent crosslinker and has a $T_g$ of about 60° C. to about −100° C. The core composition is disclosed to make up about 30–60%, by weight, of the particle weight. The acrylic emulsion polymer dispersion, which may contain ultraviolet light stabilizers, is disclosed to be useful in treating textile or nonwoven substrates. U.S. Pat. No. 4,107,120 does not disclose a method for using a thermoplastic elastomeric composition for applications where low temperature flexibility and dirt pickup resistance are required nor an elastomeric composition incorporating a photosensitive composition and a method for using the elastomeric composition.

U.S. Pat. No. 4,148,987 discloses a copolymer containing a photosensitive phenone monomer such as vinylbenzyl benzoylbenzoate. The copolymers are disclosed to be useful as nonwovens binders and in coating and impregnating substrates. U.S. Pat. No. 4,148,987 does not disclose a method for using a thermoplastic elastomeric composition containing a multistage emulsion polymer for applications where low temperature flexibility and dirt pickup resistance are required nor an elastomeric composition incorporating a photosensitive composition and a method for using the elastomeric composition.

U.S. Pat. No. 4,814,373 discloses modified aqueous dispersions of water-insoluble latex polymer prepared by swelling an initial water-insoluble latex polymer, prepared by emulsion polymerization, with additional ethylenically unsaturated monomer, including at least one monomer with two or more sites of ethylenic unsaturation, and subsequently polymerizing the additional monomer within the swollen latex particles. The toughened soft polymeric dispersions are disclosed to be useful for coatings designed for application to roofing substrates and to concrete structures. U.S. Pat. No. 4,814,373 does not disclose a method for using a thermoplastic elastomeric composition for applications where low temperature flexibility and dirt pickup resistance are required nor an elastomeric composition incorporating a photosensitive composition and a method for using the elastomeric composition.

European Patent Application Publication No. 10,000 discloses a putty-like mastic, caulking, sealant, or adhesive composition containing a photosensitive compound such as a benzophenone derivative. EP 10,000 A does not disclose a method for using a thermoplastic elastomeric composition for applications where low temperature flexibility and dirt pickup resistance are required nor an elastomeric composition incorporating a photosensitive composition and a method for using the elastomeric composition.

European Patent Application Publication No. 321,830 A discloses soft, thermoplastic polymer alloys with elastic properties which contain 10–50, preferably 10–35, wt. % thermoplastic polyamide and 90–50, preferably 90–65, wt. % particulate rubber copolymer. The particulate rubber copolymer contains 0–5, preferably 0–2, wt. % crosslinking monomer with at least two olefinically unsaturated groups and has a gel content of 20–99%. The polymer alloys are disclosed to be used for moldings, coatings, sealants, and the like. EP 321, 830 A does not disclose a method for using a thermoplastic elastomeric composition for applications where low temperature flexibility and dirt pickup resistance are required nor an elastomeric composition incorporating a photosensitive composition and a method for using the elastomeric composition.

European Patent Application Publication No. 387,664 A discloses a multistage emulsion polymer which is capable of drying to films with relatively low tack and high elongation even at low temperatures. The multistage polymer may be in the form of a core/shell latex particle. The core polymer is disclosed to contain from 0.1 to 2, preferably from 0.2 to 0.6, wt. % of the core material of a crosslinking monomer, has a $T_g$ below 0° C., preferably below −20° C., and is present at a level of at least 50 wt. %, preferably 60 to 90 wt. %, of the emulsion polymer. The shell polymer is essentially not crosslinked, has a T. below 60° C., preferably from −20 to 40° C., has a $T_g$ at least 10° C., preferably 20–60° C., above that of the core material, and constitutes from 10–50 wt. % of the emulsion polymer. The polymer is disclosed to be suitable as a binder for nonblocking coatings on nonrigid substrates including flexible substrates such as leather and textiles, on the one hand, and on substrates interrupted by cracks such as cracked plaster or brickwork, on the other hand. EP 387,664 A does not disclose a method for using a thermoplastic elastomeric composition for applications where low temperature flexibility and dirt pickup resistance are required nor an elastomeric composition incorporating a photosensitive composition and a method for using the elastomeric composition.

None of the references teach a method for using a thermoplastic elastomeric composition containing a multistage emulsion polymer for applications where low temperature flexibility and dirt pickup resistance are required nor an elastomeric composition containing a multistage emulsion polymer incorporating a photosensitive composition and a method for using the elastomeric composition.

It is, therefore, an object of this invention to provide a thermoplastic elastomeric composition containing a multistage emulsion polymer for use in applications where low temperature flexibility and dirt pickup resistance are required and an elastomeric composition containing a multistage emulsion polymer incorporating a photosensitive composition and a method for using the elastomeric composition.

It is also an object of this invention to provide improved roof mastics, elastomeric wall coatings, and caulks.

It is also an object of this invention to provide a multistage emulsion polymer which requires lowered levels of coalescing aid while providing a composition with low temperature flexibility and dirt pickup resistance.

It is a further object of this invention to provide a low $T_g$, high tensile strength, elastomeric, low-tack polymer composition.

SUMMARY OF THE INVENTION

A method for using a thermoplastic elastomeric composition containing a multi-staged emulsion polymer binder is provided. An elastomeric composition containing a multi-staged emulsion polymer and a photosensitive composition and a method for using the elastomeric composition are also provided.

DETAILED DESCRIPTION OF THE INVENTION

This invention relates to a method for using a thermoplastic elastomeric composition containing a multi-staged emulsion polymer binder. Elastomeric compositions containing a multi-staged emulsion polymer and a photosensitive composition and a method for using the elastomeric composition are also provided.

An "elastomeric composition" as used herein is a composition which contains at least two mutually incompatible polymers. An elastomeric composition exhibits a balance of tensile strength, low temperature flexibility and dirt pickup resistance which is superior to that obtained when the polymeric binder contained in the elastomeric composition is a single-stage, single-phase polymer.

A multi-staged thermoplastic emulsion polymer binder is prepared by the addition polymerization of at least one ethylenically-unsaturated monomer in each stage of a multi-stage process. For example, acrylic ester monomers including methyl acrylate, ethyl acrylate, butyl acrylate, 2-ethylhexyl acrylate, decyl acrylate, methyl methacrylate, butyl methacrylate, i-butyl methacrylate, i-bornyl methacrylate, hydroxyethyl acrylate, hydroxyethyl methacrylate, hydroxypropyl methacrylate, N,N-dimethylaminoethyl methacrylate, and t-butylaminoethyl methacryate; acrylamide or substituted acrylamides; styrene or substituted styrenes; butadiene; vinyl acetate or other vinyl esters; vinyl ethers; acrylonitrile or methacrylonitrile; and the like, may be used. Low levels of ethylenically-unsaturated carboxylic acids such as, for example, methacrylic acid, acrylic acid, itaconic acid, maleic acid, fumaric acid, and the like, at a level of 0–5%, by weight based on the weight of the polymeric binder, may be used.

"Thermoplastic" as used herein means that the composition is not intentionally crosslinked as by the incorporation of multi-ethylenically unsaturated monomers into the monomer mixtures for any of the stages of the multi-staged emulsion polymer binder. Gel content or precrosslinking as may result adventitiously during the polymerization reaction are not excluded herein by use of the term "thermoplastic".

The multi-staged emulsion polymer binder contains polymer particles made up of at least two mutually incompatible polymers. These mutually incompatible polymers may be present in the following morphological configurations, for example: core/shell, core/shell particles with shell phases incompletely encapsulating the core, core/shell particles with a multiplicity of cores, interpenetrating network particles, and the like.

The mutual incompatibility of the polymer compositions may be determined in various ways known in the art. The use of scanning transmission electron microscopy using staining techniques, where appropriate, to emphasize the difference between the appearance of the phases, for example, is such a technique.

It is preferred that the mutually incompatible polymers are selected so that the $T_g$ of at least one first polymer is lower than the $T_g$ of at least one second polymer. The $T_g$ of the polymers are calculated by using the Fox equation (T. G. Fox, Bull. Am. Physics Soc., Volume 1, Issue No. 3, page 123(1956)). The $T_g$ of the first polymer is from about −30° C. to about −60° C. and the first polymer consists of about 70–95% by weight, based on the total polymer weight. The $T_g$ of the second polymer is from about 0° C. to 60° C. and the second polymer consists of about 5–30% by weight, based on the total polymer weight. Preferred is a difference in $T_g$ between the $T_g$ of the first polymer and the $T_g$ of the second polymer of at least about 40° C.

The emulsion polymerization techniques used to prepare such multi-staged emulsion polymer binders are well known in the art. For example, sequential emulsion polymerization processes which are believed to yield core/shell particles are taught in U.S. Pat. Nos. 4,325,856 and 4,654,397, which are hereby incorporated herein by reference. Other modified latex polymer compositions which are believed to contain particles incorporating multiple incompatible polymeric phases are taught in U.S. Pat. No. 4,814,373, which is hereby incorporated herein by reference.

The monomers may be emulsified with an anionic, cationic, or nonionic surfactant or dispersing agent, or compatible mixtures thereof such as a mixture of an anionic and a nonionic surfactant, using, for example, from about 0.05% to about 5% by weight of a surfactant or dispersing agent based on the weight of the monomer. Suitable cationic dispersion agents include lauryl pyridinium chloride, cetyldimethyl amine acetate, and alkyldimethylbenzylammonium chloride, in which the alkyl group has from 8 to 18 carbon atoms. Suitable anionic dispersing agents include, for example, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium t-octylphenoxypolyethoxyethyl sulfate, having 1 to 5 oxyethylene units, and the like. Suitable non-ionic dispersing agents include, for example, alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

Initiation of the emulsion polymerization may be carried by the thermal decomposition of free radical precursors which are capable of generating radicals suitable for initiating addition polymerization such as, for example, ammonium or potassium persulfate. Or such free radical precursors may be used as the oxidizing component of a redox system, which also includes a reducing component such as potassium metabisulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe(III) and ammonium persulfate/sodium bisulfite/sodium hydrosulfite/Fe(III). The polymerization temperature may be from about 20° C. to about 95° C.

The first stage of the multi-staged process may be seeded, i.e., initiated in the presence of a small particle size preformed emulsion polymer, or unseeded. Seeded polymerization is preferred and tends to yield aqueous dispersions of latex polymer having more uniform particle size than unseeded polymerization.

Chain transfer agents including mercaptans, polymercaptans, alcohols, and halogen compounds are sometimes used in the polymerization mixture in order to moderate the molecular weight of the polymeric binder. Generally, from 0% to about 3% by weight, based on the weight of the polymeric binder, of $C_4$–$C_{20}$ alkyl mercaptans, mercaptopropionic acid, or esters of mercaptopropionic acid, may be used.

The weight average molecular weight of the polymer stages, as measured by gel permeation chromatography is from about 100,000 to 10,000,000.

Each stage of the multi-staged process may incorporate thermal or redox initiation of polymerization. A monomer emulsion containing all or some portion of the monomers to be polymerized in a given stage may be prepared using the monomers, water, and emulsifiers. A solution of initiator in water may be separately prepared. The monomer emulsion and initiator solution may be cofed into the polymerization vessel over the course of the emulsion polymerization of any stage of the process. The reaction vessel itself may also initially contain seed emulsion and further may additionally contain an initial charge of polymerization initiator. The temperature of the contents of the reaction vessel may be controlled by cooling to remove heat generated by the polymerization reaction or by heating the reaction vessel. Several monomer emulsions may be simultaneously cofed into the reaction vessel. When multiple monomer emulsions are cofed, they may be of different monomer composition. The sequence and rates at which the monomer emulsions are cofed may be altered during the emulsion polymerization process. After addition of the first stage monomer emulsion or emulsions has been completed, the polymerization reaction mixture may be held at some temperature for a time and/or treated with a polymerization inhibitor prior to polymerization of the second, or subsequent stages. Similarly, after addition of the final stage monomer emulsion or emulsions has been completed, the polymerization reaction mixture may be held at some temperature for a time and/or treated with a polymerization inhibitor before cooling to ambient temperature. A multi-staged process which is a two-stage process is preferred.

Adjuvants useful in the preparation of the multi-staged polymer binder and/or in its subsequent use and which may be added during or subsequent to the polymerization reaction may include auxilliary surfactants; defoamers such as, for example, SURFYNOL 104E and Nopco NXZ used at a level from about 0.001 to about 0.1%, by weight based on the weight of the monomer mixture; levelling agents such as, for example, Sag® Silicone Antifoam 47 used at a level from about 0.001 to about 0.1%, by weight based on the weight of the monomer mixture; antioxidants such as, for example, MAROXOL 20 and IRGANOX 1010 used at a level from about 0.1 to about 5%, by weight based on the weight of the monomer mixture; plasticizers such as, for example, FLEXOL® plasticizer; and preservatives such as, for example, KATHON® and PROXEL® GXL used at a level of 5–250 ppm.

The particles of the multi-staged emulsion polymer binder are from about 80 to about 400 nanometers in diameter, as measured using a Brookhaven BI-90 Particle Sizer, which employs a light scattering technique. However, polymodal particle size distributions such as those disclosed in U.S. Pat. Nos. 4,384,056 and 4,539,361, hereby incorporated herein by reference, may be employed.

Elastomeric compositions containing a multi-staged emulsion polymer binder and a photosensitive composition are useful in coatings, caulks, and sealants where low temperature flexibility and dirt pickup resistance are required. The multi-staged emulsion-polymer binder is made in accordance with the teachings regarding the multi-staged thermoplastic binder herein-above with the exception that multi- ethylenically unsaturated monomers may be used in the preparation of any one or more of the stages of the multi-staged emulsion polymer binder. Multi-ethylenically unsaturated monomers such as, for example, allyl methacrylate, diallyl phthalate, 1,4-butylene glycol dimethacrylate, 1,6-hexanediol diacrylate, and the like, may be used at a level of 0.01–10% by weight, based on the weight of the polymeric binder. Preferred is the use of 0.01–5% by weight, based on the weight of the stage, of multi- ethylenically unsaturated monomer incorporated into the stage monomer. When it is desirable to include multi-ethylenically unsaturated monomer in the second stage of a two-stage polymerization the process disclosed in U.S. Pat. No. 4,814,373 may be used.

The photosensitive composition contains a grouping capable of absorbing some portion of the solar light spectrum. The photosensitive composition may be a photosensitive compound added to the multi-staged emulsion polymer binder or to the elastomeric composition in the manner of an additive, or it may be a photosensitive oligomer or photosensitive polymer, or it may be a photosensitive grouping chemically incorporated into one or more stages of the multi-staged emulsion polymer binder such as, for example, by copolymerization. Preferred photosensitive compounds are benzophenone derivatives used at a level of from about 0.1 to about 5% by weight, based on the weight of the multi-staged emulsion polymer binder, wherein one or both of the phenyl rings may be substituted such as, for example, benzophenone, 4-methyl benzophenone, 4-hydroxy benzophenone, 4-amino benzophenone, 4-chloro benzophenone, 4-hydrocarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones, and the like. More preferred is benzophenone or a 4-substituted (para-) benzophenone. Benzophenone itself is most preferred. Photosensitive groupings capable of being chemically incorporated may be present as copolymerized ethylenically unsaturated monomers which may be used at a level of about 0.5 to about 5%, by weight based on weight of the binder, such as are disclosed in U.S. Pat. Nos. 3,429,852; 3,574,617; and 4,148,987, hereby incorporated herein by reference. Additionally, allyl benzoylbenzoates and copolymerizable monomers incorporating pendant benzophenone radicals may be used. Preferred are vinylbenzyl methylbenzoylbenzoate, hydroxymethacryloxypropyl methylbenzoylbenzoate, hydroxymethacryloxypropyl benzoylbenzoate, and hydroxymethacryloxypropoxy benzophenone.

In addition to the elastomeric binder components, conventional coatings, caulk, and sealant components such as, for example, pigments, extenders, dispersants, surfactants, coalescents, wetting agents, thickeners, rheology modifiers, drying retarders, plasticizers, biocides, defoamers, colorants, waxes, and the like, may be used in the elastomeric compositions of this invention.

The coatings, caulks, and sealants of this invention may be prepared by mixing the elastomeric binder with conventional components in high speed dispersion equipment such as a Cowles disperser, or a Sigma mill for caulks and sealants.

The coatings, caulks, and sealants of this invention may be applied to a wide variety of architectural construction materials such as, for example, wood, concrete, metal, glass, ceramics, plastics, plaster, stucco, and roofing substrates such as asphaltic coatings, roofing felts, synthetic polymer membranes, and foamed polyurethane insulation; or to previously painted, primed, undercoated, worn, or weathered substrates.

The coatings, caulks, and sealants of this invention may be applied by a variety of techniques well known in the art such as, for example, air- assisted or airless spray, electrostatic spray, brush, rollers, mops, caulking guns, trowels, and the like.

The following examples are intended to illustrate the method and composition to which this invention is directed. They are not intended to limit the invention as other applications of the invention will be obvious to those of ordinary skill in the art.

EXAMPLE 1

Preparation of Thermoplastic Multi-Staged Emulsion Polymer: Shot Addition Second Stage Process Preparation of Sample 1. Into a 5 liter, four-neck, round-bottomed flask ("kettle") equipped with a stirrer, thermometer, and reflux condenser was charged 620 g. deionized water ("DI water") which was then heated to 830 C. in a nitrogen atmosphere. With the kettle water at 83° C. the following materials were charged to the kettle: 2.16 g. ammonium persulfate in 25 g. DI water, 105 g. of a 100 nm. 52 MMA/46.7 BA/1.3 MAA preformed emulsion polymer seed at 45% solids content, and 20 g. DI water Immediately after the addition of the above materials, feeding of the monomer emulsion (ME#1) and a solution of 2.16 g. ammonium persulfate in 120 g. DI water were begun and carried over a period of 180 minutes at a kettle temperature of 80–82° C., a temperature maintained by cooling as required. When 40% of the ME#1 feed had been added, the feeds were stopped and 2 g. aqueous ammonia (28%) in 6 g. DI water was added to the kettle. The feeds were then resumed. When the ME#1 feed and a 30 g. DI water rinse and the ammonium persulfate feed were completed, the batch was held at 82° C. for about 15 minutes and then allowed to cool slowly to 75° C. A solution of 3 g. ammonia (28%) in 9 g. DI water was then added. The following solutions: 2 g. of a 1% solution of ferrous sulfate heptahydrate; 3.5 g. t-butyl hydroperoxide (70% active) in 10 9. DI water; and 1.8 g. isoascorbic acid in 40 g. DI water were added. About 15 minutes later with the temperature still over 70° C., 3.5 g. t-butyl hydroperoxide (70% active) in 10 g. DI water was added and a solution of 1.8 g. isoascorbic acid in 40 g. DI water was added over a period of 15 minutes. The batch was then allowed to cool to 60° C. and 3.5 g. t-butyl hydroperoxide (70% active) in 10 g. DI water and 1.8 g. isoascorbic acid in 40 g. DI water were added. The pH of the batch was adjusted with aqueous ammonia, if required, to a pH=4–6. Addition of 200 g. DI water and then a charge of 0.2 g. diethyl hydroxyl amine in 6 g. DI water were made. At 60° C., the second stage monomer emulsion (ME#2) was added to the kettle containing the first stage emulsion polymer and allowed to stir for 15 minutes. To this mixture was added 0.41 g. t-butyl hydroperoxide (70% active) in 8.3 g. DI water and 0.27 9. isoascorbic acid in 24 9. DI water. An exotherm began within 5 minutes and the temperature rose from 47 to 61° C. over about 10 minutes. Fifteen minutes after reaching the peak temperature, 0.41 g. t-butyl hydroperoxide (70% active) in 8.3 g. DI water and 0.27 g. isoascorbic acid in 24 g. DI water were added. The emulsion polymer was then allowed to cool to ambient temperature and was filtered yielding a product with 54.5% solids, pH=5.1, and a Brookfield viscosity of 75 cps.

TABLE 1.1

Monomer Emulsion #1 for Sample 1 Preparation (ME#1)

| | |
|---|---|
| DI water | 460. g. |
| Anionic surfactant (SIPONATE DS-4) | 9.4 g. |
| Butyl acrylate | 1648.8 g. |
| Acrylonitrile | 126. g. |
| Acrylic acid | 25.2 g. |

TABLE 1.2

Monomer Emulsion #2 for Sample 1 Preparation (ME#2)

| | |
|---|---|
| DI water | 106. g. |
| Anionic surfactant (SIPONATE DS-4) | 2.0 g. |
| Butyl acrylate | 148.5 g. |
| Methyl methacrylate | 234.0 g. |
| Methacrylic acid | 22.5 g. |
| Ureido Methacrylate | 45.0 g. |

The ureido methacrylate and the method of its preparation are disclosed in U.S. Pat. No. 4,599,417, hereby incorporated herein by reference.

EXAMPLE 2

Preparation of Thermoplastic Multi-Staged Emulsion Polymer: Gradual Addition Second Stage Process Preparation of Sample 2. Into a 5 liter, four-neck, round-bottomed flask ("kettle") equipped with a stirrer, thermometer, and reflux condenser was charged 620 g. deionized water("DI water") which was then heated to 83° C. in a nitrogen atmosphere. With the kettle water at 83° C. the following materials were charged to the kettle: 2.16 g. ammonium persulfate in 25 g. DI water, 105 g. of a 100 nm. 52 MMA/46.7 BA/1.3 MAA preformed emulsion polymer seed at 45% solids content, and 20 g. DI water Immediately after the addition of the above materials, feeding of the monomer emulsion (ME#1) and a solution of 2.16 g. ammonium persulfate in 120 9. DI water were begun and carried over a period of 180 minutes at a kettle temperature of 80–82° C., a temperature maintained by cooling as required. When 40% of the ME#1 feed had been added, the feeds were stopped and 3 g. aqueous ammonia (28%) in 9 g. DI water was added to the kettle. The feeds were then resumed. When the ME#1 feed and a 30 g. DI water rinse and the ammonium persulfate feed were completed, the batch was held at 82° C. for about 15 minutes and then allowed to cool slowly to about 77° C. A solution of ammonia (28%) in DI water was then added to pH=6. The following solutions: 2 g. of a 1% solution of ferrous sulfate heptahydrate; 3.5 g. t-butyl hydroperoxide (70% active) in 10 g. DI water; and 1.8 9. isoascorbic acid in 40 g. DI water were added. About 15 minutes later with the temperature still over 70° C., 3.5 g. t-butyl hydroperoxide (70% active) in 10 g. DI water was added and a solution of 1.8 g. isoascorbic acid in 40 g. DI water was added over a period of 15 minutes. The batch was then allowed to cool to 65° C. and 1.8 g. t-butyl hydroperoxide (70% active) in 10 g. DI water and 0.9 g. isoascorbic acid in 20 g. DI water were added. The pH of the batch was adjusted with aqueous ammonia, if required, to a pH=4–6. Addition of 220 g. DI water was made. At 65° C., the second stage monomer emulsion (ME#2), 0.41 g. t-butyl hydroperoxide (70% active) in 8.3 g. DI water, and 0.27 9. isoascorbic acid in 24 g. DI water were concurrently added to the kettle containing the first stage emulsion polymer over a period of 30 minutes; cooling and heating was supplied to maintain the temperature at 65° C. The batch was then held at 65° C. for 30 minutes. To this mixture was added 0.41 g. t-butyl hydroperoxide (70% active) in 8.3 g. DI water and 0.27 g. isoascorbic acid in 24 g. DI water. The emulsion polymer was then allowed to cool to ambient temperature and was filtered yielding a product with 53.6% solids.

TABLE 2.1

Monomer Emulsion #1 for Sample 2 Preparation (ME#1)

| | |
|---|---|
| DI water | 460. g. |
| Anionic surfactant (SIPONATE DS-4) | 9.4 g. |
| Butyl acrylate | 1648.8 g. |
| Acrylonitrile | 126. g. |
| Acrylic acid | 25.2 g. |

TABLE 2.2

Monomer Emulsion #2 for Sample 2 Preparation (ME#2)

| | |
|---|---|
| DI water | 106. g. |
| Anionic surfactant (SIPONATE DS-4) | 2.0 g. |
| Butyl acrylate | 150.8 g. |
| Methyl methacrylate | 288.0 g. |
| Methacrylic acid | 11.3 g. |

COMPARATIVE A

Preparation of Thermoplastic Single-Staged Emulsion Polymer

Preparation of Sample 3. Into a 5 liter, four-neck, round-bottomed flask ("kettle") equipped with a stirrer, thermometer, and reflux condenser was charged 620 g. deionized water ("DI water") which was then heated to 83° C. in a nitrogen atmosphere. With the kettle water at 83° C. the following materials were charged to the kettle: 2.16 g. ammonium persulfate in 25 g. DI water, 105 g. of a 100 nm. 52MMA/46.7BA/1.3MAA preformed emulsion polymer seed at 45% solids content, and 20 g. DI water. Immediately after the addition of the above materials, feeding of the monomer emulsion (ME#1) and a solution of 2.16 g. ammonium persulfate in 120 g. DI water were begun and carried over a period of 180 minutes at a kettle temperature of 80–82° C., a temperature maintained by cooling as required. When 40% of the ME#1 feed had been added, the feeds were stopped and 2 g. aqueous ammonia (28%) in 6 g. DI water was added to the kettle; and 12 g of a 30% solution of ureido methacrylate in methyl methacrylate was added to the monomer emulsion. The feeds were then resumed. When the ME#1 feed and a 30 g. DI water rinse and the ammonium persulfate feed were completed, the batch was held at 82° C. for 15 minutes and then allowed to cool slowly to 75° C. A solution of 3 g. ammonia (28%) in 9 g. DI water was then added. The following solutions: 2 g. of a 1% solution of ferrous sulfate heptahydrate; 3.5 g. t-butyl hydroperoxide (70% active) in 10 g. DI water; and 1.8 g. isoascorbic acid in 40 g. DI water were added. About 15 minutes later with the temperature still over 70° C., 3.5 g. t-butyl hydroperoxide (70% active) in 10 g. DI water was added and a solution of 1.8 g. isoascorbic acid in 40 g. DI water was added over a period of 15 minutes. The batch was then allowed to cool to 60° C. and 3.5 g. t-butyl hydroperoxide (70% active) in 10 g. DI water and 1.8 g. isoascorbic acid in 40 g. DI water were added. The pH of the batch was adjusted with aqueous ammonia, if required, to a pH=4–6. Addition of 50 g. DI water was made. The emulsion polymer was then allowed to cool to ambient temperature and was filtered yielding a product with 55.3% solids, pH=5.0, and a Brookfield viscosity of 115 cps.

TABLE 3.1

Monomer Emulsion #1 for Comparative A Preparation (ME#1)

| | |
|---|---|
| DI water | 460. g. |
| Anionic surfactant (SIPONATE DS-4) | 9.4 g. |
| Butyl acrylate | 1437.8 g. |
| Acrylonitrile | 100.8 g. |
| Acrylic acid | 20.2 g. |
| Methacrylic acid | 9.0 g. |

COMPARATIVES B–G

Preparation of Additional Thermoplastic Single-Staged Emulsion Polymers

Preparation of Comparatives B–G. Comparatives B–F were prepared according to the method of Comparative A with the exception of the monomer compositions Comparative G which is a blend of Comparatives E and F.

| Sample | Composition |
|---|---|
| B | 84.6 BA/6.55 MMA/6 AN/2.1 MAA/0.75 UM |
| C | 79.88 BA/5.6 AN/12.7 MAA/1.12 AA/0.5 MAA/0.2 UM |
| D | 76.3 BA/5.6 AN/15.8 MMA/2.3 MAA |
| E | 90.7 BA/7 AN/2.3 MAA |
| F | 18.7 BA/79 MMA/2.3 MAA |
| G | A blend of 80% Comp. E + 20% Comp. F |

EXAMPLE 4

Preparation of Additional Thermoplastic Multi-Staged Emulsion Polymers

Preparation of Samples 3–5. Samples 3–5 were prepared according to the method of Example 1 with the exception of the monomer compositions and relative amounts of the two stages and the final latex properties which are presented in Tables 4.1 and 4.2.

TABLE 4.1

Monomer emulsion compositions and relative amounts of the two stages

| Sample | Stage I | Stage II |
|---|---|---|
| 3 | 85(90.7 BA/7 AN/2.3 MAA) | 15(51 BA/43 MMA/1 MAA/5 UM) |
| 4 | 80(91.6 BA/7 AN/1.4 AA) | 20(33 BA/63.5 MMA/2.5 MAA/1 UM) |
| 5 | 80(90.7 BA/7 AN/2.3 MAA) | 20(18.7 BA/79 MMA/2.3 MAA) |

Note: BA = butyl acrylate; AN = acrylonitrile; MAA = methacrylic acid; UM = uriedo Methacrylate; AA = acrylic acid. 20(X/Y/Z) = 20 parts of a polymer, p(X/Y/Z)

TABLE 4.2

Final Emulsion Polymer Properties

| Sample | % Solids | pH | Brookfield Viscosity (cps.) |
|---|---|---|---|
| 3 | 56.9 | 5.4 | — |
| 4 | 54.5 | 5.0 | 75 |
| 5 | 56.3 | 5.7 | 355 |

EXAMPLE 5

Preparation of Thermoplastic Multi-Staged Emulsion Polymers Using Different Monomer Mixtures Preparation of Samples 6–13 and Comparatives H–K. Samples 6–13 were prepared according to the method of Example 1 with the exception of the monomer compositions and relative amounts of the two stages; these parameters and the final latex properties are presented in Tables 5.1 and 5.2. Comparative Samples H–K were prepared according to the method of Comparative A with the exception of the monomer compositions; these parameters and the final latex properties are presented in Tables 5.3 and 5.4.

Clear films were prepared by placing sufficient emulsion polymer in a polyethylene dish to yield an approximately 20 mil dry film. The emulsion was allowed to dry to the point where the film was clear. The film was then conditioned for 18–24 hours at 60° C. Mechanical properties were measured on an INSTRON testing machine at a crosshead speed of 2 inch/min. with the dogbone shaped samples (0.725 inch gauge length) clamped on the ears (ASTM Test Method D-412), reporting the "tensile strength" at maximum tensile strength and the % elongation at break. A comparison of mechanical properties is presented in Table 5.5.

TABLE 5.1

Monomer emulsion compositions and relative amounts of the two stages

| Sample | Stage Compositions |
|---|---|
| 6 | Stage I: 85(91.35 BA/7 MMA/1.65 MAA) |
| | Stage II: 15(50.35 BA/43 MMA/1.65 MAA/5 UM) |
| 7 | Stage I: 80(93.65 BA/4.7 MMA/1.65 MAA) |
| | Stage II: 20(50.35 BA/43 MMA/1.65 MAA/5 UM) |
| 8 | Stage I: 80(98.35 BA/1.65 MAA) |
| | Stage II: 20(31.6 BA/61.75 MMA/1.65 MAA/5 UM) |
| 9 | Stage I: 80(91.6 BA/7 Sty/1.4 AA) |
| | Stage II: 20(40.8 BA/56.7 MMA/2.5 MAA) |
| 10 | Stage I: 80(91.6 BA/7 Sty/1.4 AA) |
| | Stage II: 20(40.3 BA/32.2 MMA/25 Sty/2.5 MAA) |
| 11 | Stage I: 85(90.4 BA/7 AN/2.6 MAA) |
| | Stage II: 15(51 BA/43 MMA/1 MAA/5 UM) |
| 12 | Stage I: 80(91.2 EHA/7 AN/1.8 MM) |
| | Stage II: 20(40.8 BA/56.7 MMA/2.5 MAA) |
| 13 | Stage I: 80(78.2 EHA/20 AN/1.8 MAA) |
| | Stage II: 20(40.8 BA/56.7 MMA/2.5 MAA) |

Note: BA = butyl acrylate; AN = acrylonitrile; MAA = methacrylic acid; UM = ureido Methacrylate; AA = acrylic acid; Sty = styrene; EHA = 2-ethylhexyl acrylate. 20(X/Y/Z) = 20 parts of a polymer, p(X/Y/Z)

TABLE 5.2

Final Emulsion Polymer Properties

| Sample | % Solids | pH | Brookfield Viscosity (cps.) |
|---|---|---|---|
| 6 | 54.6 | 8.8 | 133 |
| 7 | 55.7 | 8.7 | 255 |
| 8 | 55.0 | 8.5 | 206 |
| 9 | 52.0 | 3.8 | 45 |
| 10 | 51.8 | 3.6 | 53 |
| 11 | 55.4 | 6.8 | 170 |
| 12 | 54.6 | 4.9 | 120 |
| 13 | 54.9 | 5.5 | 105 |

TABLE 5.3

Monomer emulsion compositions for Comparatives H–K

| Sample | Compositions |
|---|---|
| H | 85 BA/12.35 MMA/1.65 MAA/1 UM |
| I | 91.6 BA/7 Sty/1.4 AA |
| J | 91.2 EHA/7 AN/1.8 MAA |
| K | 78.2 EHA/20 AN/1.8 MAA |

Note: BA = butyl acrylate; AN = acrylonitrile; MAA = methacrylic acid; UM = ureido Methacrylate; AA = acrylic acid; Sty = styrene; EHA = 2-ethylhexyl acrylate. 20(X/Y/Z) = 20 parts of a polymer, p(X/Y/Z)

TABLE 5.4

Final Emulsion Polymer Properties for Comparatives H–K

| Sample | % Solids | pH | Brookfield Viscosity (cps.) |
|---|---|---|---|
| H | 54.5 | 8.9 | 90 |
| I | 49.3 | 3.9 | 31 |
| J | 51.6 | 4.9 | — |
| K | 51.5 | 5.7 | — |

TABLE 5.5

Clear Film Mechanical Properties

| Sample | Tensile Strength | % Elongation |
|---|---|---|
| H | 36 | 930 |
| I | 39 | 1460 |
| J | 152 | 1390 |
| K | 43 | 1600 |
| 6 | 166 | 720 |
| 7 | 173 | 595 |
| 8 | 141 | 420 |
| 9 | 240 | 1075 |
| 10 | 215 | 1175 |
| 11 | 394 | 1595 |
| 12 | 359 | 825 |
| 13 | 1048 | 720 |

EXAMPLE 6

Evaluation of Samples 3–5 and Comparatives B–D and G for Coatings Properties

Preparation of Formulated Coatings. The following ingredients were placed in a metal can (quantities are given in grams)

| | |
|---|---|
| Water | 87.4 |
| Poly(methacrylic acid) dispersant (TAMOL 850) | 2.9 |
| Defoamer (NOPCO NXZ) | 1.9 |
| Propylene Glycol | 5.7 |
| Potassium Tripolyphosphate | 0.86 |
| Titanium Dioxide (TIPURE R-960) | 42.7 |
| Calcium Carbonate (CAMEL WITE) | 254. |
| Zinc Oxide (KADOX 515) | 30.8 |

The above ingredients were mixed for 15 minutes in a high speed Cowles disperser, and the following ingredients were added with stirring.

| | |
|---|---|
| Emulsion Polymer (at 55% solids) | 494 |
| Coalescent (TEXANOL) | 6.7 |
| Biocide (SKANE M-8) | 2.1 |
| Defoamer (NOPCO NXZ) | 1.9 |
| Thickener premix (NATROSOL 250 MXR in propylene glycol) | 3.1 / 15.9 |
| Water | 3.0 |
| Ammonia (28%) | to pH = 9–9.5 |

Formulated coatings were prepared using samples 3–5 and comparatives B–D and G.

Mechanical Properties: Coatings films were prepared in two coats using a draw down knife which gave a total dry film thickness of approximately 20 mils. The samples were dried for three weeks at 75° F./50% relative humidity before testing. Mechanical properties were measured on an INSTRON testing machine at a crosshead speed of 2 inch/min. with the dogbone shaped samples (0.725 inch gauge length) clamped on the ears (ASTM Test Method D-412), reporting the "tensile strength" at maximum tensile strength and the "% elongation" at break. Two other mechanical properties, initial modulus and Shore A hardness were also measured.

Low Temperature Flexibility: An aluminum panel was coated with 40 wet mils of formulated coating, the panel was cured for several days in the lab and then for one week at 50° C., and then measurements were made of the lowest temperature at which the panel could be bent in half without the coating cracking.

Water Properties: The water swelling of the coatings was determined by cutting out a disk of the film, immersing it in deionized water, and measuring its weight gain due to water absorption.

Water ponding and perms are measures of water passage through the coatings. Water ponding was determined as follows: the bottom of a quarter pint paint can was removed and replaced with a section of the coating (the film was attached using epoxy adhesive), water was poured into the can and a sheet of filter paper was placed underneath. The water ponding value equals the weight increase of the filter paper (due to its absorbing water passing through the film) after 50 hours. Water perms is similar except that it measures steady state water passage after longer time periods, uses a sealed container for the water, and has the bottom of the coating open to the atmosphere rather than sitting on a sheet of filter paper. Water perms are proportional to the rate of weight loss of the container due to water escaping through the coating.

Water whitening was determined as follows. Clear films were cast on black vinyl test panels, which were dried, exposed overnight in a fog box, and then soaked in water for four hours. The whiteness was measured using a 45/0 Reflectometer (lower numbers are better, i.e., less whitening).

Adhesion to PUF: The peel adhesion of the coatings to polyurethane foam (PUF) was determined by imbedding cloth strips in fresh coating applied to blocks of PUF. The blocks were dried three weeks, soaked in water one week, and then the force required to peel the strips was measured with an INSTRON testing machine.

Taber Abrasion: Taber abrasion (ASTM Test Method D-4060) was carried out using Calibrase CS-17 abrasive wheels and 1000 gram arm weights. The weight of each sample was measured initially and after 1000 revolutions of the turntable. The weight loss of the sample due to abrasion was calculated.

TABLE 6.1

Evaluation of thermoplastic multi-staged emulsion polymer in pigmented coating

| Sample | 3 | Comparative B |
|---|---|---|
| RT Tensile Strength (psi) | 663 | 529 |
| RT Elongation (%) | 418 | 561 |
| RT Initial Modulus (psi) | 2326 | 1143 |
| 0° F. Tensile Strength (psi) | 1954 | 1774 |
| 0° F. Elongation (%) | 104 | 126 |
| −15° F. Tensile Strength (psi) | 2866 | 2952 |
| −15° F. Elongation (%) | 52 | 45 |
| Shore A Hardness | 78 | 72 |
| Passes Low Temp. Flex (at x° F.) | −20 | −15 |
| Water Swelling (4 weeks) | 6% | 7% |
| Water Ponding (50 hours) (mg.) | 92 | 105 |
| Adhesion to PUF (wet) (lb./in.$^3$) | 2.3 A | 0.6 A |
| Taber Abrader (mg. loss) | 50 | 30 |

The comparison of Sample 3 of this invention and Comparative B, which have the same overall composition at a calculated Tg=−38° C. for the single-stage Comparative B is presented in Table 6.1. Sample 3 of this invention exhibits higher room temperature tensile strength and higher low temperature elongation than Comparative B. Also low temperature flexibility, hardness, water swelling, water ponding and adhesion to PUF are superior for sample 3 of this invention when compared to the single-stage polymer, Comparative B.

TABLE 6.2

Evaluation of thermoplastic multi-staged emulsion polymer in pigmented coating

| Sample | 4 | Comparative C |
|---|---|---|
| RT Tensile Strength (psi) | 644 | 518 |
| RT Elongation (%) | 357 | 628 |
| RT Initial Modulus (psi) | 4291 | 719 |
| 0° F. Tensile Strength (psi) | 1992 | 2028 |
| 0° F. Elongation (%) | 104 | 114 |
| −15° F. Tensile Strength (psi) | 2816 | 4022 |
| −15° F. Elongation (%) | 62 | 24 |
| Shore A Hardness | 82 | 69 |
| Passes Low Temp. Flex (at x° F.) | −15 | −10 |
| Water Swelling (4 weeks) | 6% | 10% |
| Water Ponding (50 hours) (mg.) | 35 | 37 |

TABLE 6.2-continued

Evaluation of thermoplastic multi-staged emulsion polymer in pigmented coating

| Sample | 4 | Comparative C |
|---|---|---|
| Adhesion to PUF (wet) (lb./in.$^3$) | 1.7 A | 0.7 A |
| Taber Abrader (mg. loss) | 20 | 10 |

The comparison of Sample 4 of this invention and Comparative C, which have the same overall composition at a calculated Tg=−34° C. for the single-stage Comparative B is presented in Table 6.2. Sample 4 of this invention exhibits higher room temperature tensile strength and higher low temperature elongation than Comparative B. Also, low temperature flexibility, hardness, water swelling, water ponding and adhesion to PUF are superior for sample 4 of this invention when compared to the single-stage polymer, Comparative C.

TABLE 6.3

Evaluation of thermoplastic multi-staged emulsion polymer in pigmented coating

| Sample | 5 | Comp. D | Comp. G |
|---|---|---|---|
| RT Tensile Strength (psi) | 724 | 572 | 472 |
| RT Elongation (%) | 262 | 532 | 347 |
| RT Initial Modulus (psi) | 7615 | 1249 | 5794 |
| 0° F. Tensile Strength (psi) | 2321 | 2734 | 1610 |
| 0° F. Elongation (%) | 42 | 46 | 67 |
| −15° F. Tensile Strength (psi) | 3238 | 4853 | 2527 |
| −15° F. Elongation (%) | 24 | 21 | 41 |
| Shore A Hardness | 88 | 72 | 81 |
| Passes Low Temp. Flex (at x° F.) | −10 | −5 | −20 |
| Water Swelling (4 weeks) | 5% | 9% | 7% |
| Water Ponding (50 hours) (mg.) | 47 | 65 | 29 |
| Water Passage (Perms) | 8 | 15 | 14 |
| Adhesion to PUF (wet) (lb./in.$^3$) | 1.3 | 0.6 | 1.1 |
| Taber Abrader (mg. loss) | 140 | 30 | 160 |

The comparison of Sample 5 of this invention, Comparative D (single- feed) and Comparative G (blend of two single-feeds), which have the same overall composition at a calculated Tg=−30° C. for the single-stage Comparative B is presented in Table 6.1. Sample 5 of this invention inhibits higher room temperature tensile strength and higher low temperature elongation than Comparative D. Also low temperature flexibility, hardness, water swelling, water ponding and adhesion to PUF are superior for sample 5 of this invention when compared to the single- stage polymer, Comparative D.

TABLE 6.4

Evaluation of thermoplastic multi-staged emulsion polymer in clear coating

| Sample | 3 | Comparative B |
|---|---|---|
| RT Tensile Strength (psi) | 373 | 249 |
| RT Elongation (%) | 1076 | 1714 |
| 0 F. Tensile Strength (psi) | 1936 | 2446 |
| 0 F. Elongation (%) | 493 | 748 |
| −15 F. Tensile Strength (psi) | 3275 | 3737 |
| −15 F. Elongation (%) | 396 | 479 |
| Shore A Hardness | 28 | 15 |
| Water Whitening | 12 | 19 |

The comparison of Sample 3 of this invention and Comparative B, which have the same overall composition at a calculated Tg=−38° C. (for the single-stage Comparative B)

is presented in Table 6.4. Sample 3 of this invention exhibits higher room temperature tensile strength and comparable low temperature elongation when compared to Comparative B. Also hardness and water whitening are superior for sample 3 of this invention when compared to the single-stage polymer, Comparative B.

TABLE 6.5

Evaluation of thermoplastic multi-staged emulsion polymer in clear coating

| Sample | 4 | Comparative C |
|---|---|---|
| RT Tensile Strength (psi) | 320 | 96 |
| RT Elongation (%) | 1238 | 2744 |
| 0° F. Tensile Strength (psi) | 2134 | 2633 |
| 0 F. Elongation (%) | 538 | 565 |
| −15° F. Tensile Strength (psi) | 2913 | — |
| −15° F. Elongation (%) | 308 | — |
| Shore A Hardness | 36 | 15 |
| Water Whitening | 9 | 14 |

The comparison of Sample 4 of this invention and Comparative C, which have the same overall composition at a calculated Tg=−34° C. (for the single-stage Comparative C) is presented in Table 6.5. Sample 4 of this invention exhibits higher room temperature tensile strength and comparable low temperature elongation when compared to Comparative C. Also, hardness and water whitening are superior for sample 4 of this invention when compared to the single-stage polymer, Comparative C.

TABLE 6.6

Evaluation of thermoplastic multi-staged emulsion polymer in clear coating

| Sample | 5 | Comp. D | Comp. G |
|---|---|---|---|
| RT Tensile Strength (psi) | 307 | 106 | 78 |
| RT Elongation (%) | 855 | 2441 | 1331 |
| RT Initial Modulus (psi) | 642 | 55 | 101 |
| 0° F. Tensile Strength (psi) | 2399 | 3119 | 753 |
| 0° F. Elongation (%) | 365 | 386 | 951 |
| −15° F. TensileStrength (psi) | 347 | — | 1336 |
| −15° F. Elongation (%) | 328 | — | 866 |
| Shore A Hardness | 50 | 20 | 23 |
| Water Swelling (4 weeks) | 30% | 36% | 75% |
| Water Whitening | 13 | 18 | 26 |
| Surface Tack | low | high | high |
| Film Clarity | clear | clear | cloudy |

The comparison of Sample 5 of this invention, Comparative D (single- feed) and Comparative G (blend of two single-feeds), which have the same overall composition at a calculated Tg=−30° C. (for the single-stage Comparative D) is presented in Table 6.6. Sample 5 of this invention exhibits higher room temperature tensile strength and nearly equal low temperature elongation even at 0° F. when compared to Comparative D. Also hardness, water swelling, water whitening, and surface tack are superior for sample 5 of this invention when compared to the single-stage polymer, Comparative D.

EXAMPLE 7

Preparation and Evaluation of Samples with Varying Crosslinking Monomer Level in the First Stage Preparation of sample 14 and Comparatives L–M. Sample 14 and Comparatives L–M were prepared according to the method of Example 1 with the multi-ethylenically unsaturated monomer, allyl methacrylate (ALMA), incorporated into the first stage. The compositions are given in Table 7.1 which follows. Clear films were evaluated according to the method of Example 5; results of mechanical testing are presented in Table 7.2 .Formulated mastics were prepared according to the formulation given in Table 7.3. Mechanical testing was conducted according to the method of Example 6 with the exception that the Instron was operated with a crosshead speed of 20 inches/minute; the results of mechanical testing are presented in Table 7.4.

TABLE 7.1

Composition of sample 14 and comparatives L-M

| Sample | Composition |
|---|---|
| 14 | Stage I: 85(91.6 BA/7 AN/1.4 AA) |
| | Stage II: 15(50 BA/44 MMA/5 MAA/1.0 UM) |
| Comp. L | Stage I: 85(91.58 BA/7 AN/0.02 ALMA/1.4 AA) |
| | Stage II: 15(50 BA/44 MMA/5 MAA/1.0 UM) |
| Comp. M | Stage I: 85(91.55 BA/7 AN/0.05 ALMA/1.4 AA) |
| | Stage II: 15(50 BA/44 MMA/5 MAA/1.0 UM) |

TABLE 7.2

Clear film properties of samples with varying crosslinking monomer level in the first stage

| Sample | RT Tensile Strength (psi) | RT Elongation (%) |
|---|---|---|
| 14 | 426 | 1130 |
| Comp. L | 483 | 832 |
| Comp. M | 481 | 727 |

TABLE 7.3

Preparation of formulated mastic coatings.
The following ingredients were placed in a metal can (quantities are given in grams)

| Water | 96 |
|---|---|
| Poly(methacrylic acid) dispersant (TAMOL 850) | 0.75 |
| Defoamer (NOPCO NXZ) | 1.2 |
| Ethylene Glycol | 15.0 |
| Potassium Tripolyphosphate | 0.22 |
| Titanium Dioxide (TIPURE R-960) | 27.7 |
| Calcium Carbonate (CAMEL WITE) | 38.8 |
| Zinc Oxide (KADOX 51.5) | 18.5 |

The above ingredients were mixed for 15 minutes in a high speed Cowles disperser, and the following ingredients were added with stirring.

| Emulsion Polymer (at 55% solids) | 309 |
|---|---|
| Coalescent (TEXANOL) | 4.4 |
| Biocide (SKANE M-8) | 1.3 |
| Defoamer (NOPCO NXZ) | 1.2 |
| Water | 5.0 |
| Ammonia (28%) | to pH = 9–9.5 |

TABLE 7.4

Evaluation of pigmented coatings

| Sample | 14 | Comp. L | Comp. M |
|---|---|---|---|
| RT Tensile Strength (psi) | 841 | 823 | 810 |
| RT Elongation(%) | 685 | 547 | 471 |
| 0 F. Tensile Strength (psi) | 2239 | 2008 | 2039 |
| 0 F. Elongatlon (%) | 268 | 254 | 227 |

The % elongation of thermoplastic multi-staged emulsion polymer sample 14 used in the method of this invention is superior to that of Comparatives L–M which are not thermoplastic, i.e., which incorporate multi-ethylenically unsaturated monomer in the first stage.

EXAMPLE 8

Dirt Pickup for Thermoplastic Multi-Staged Emulsion Polymer Binder in Pigmented Coating on Outdoor Exposure Evaluation of Samples 3–5 and Comparatives B–D and G for dirt pickup after outdoor exposure. Coated samples using pigmented coatings were prepared according to Example 6. The samples were placed horizontally, face-up on a roof of a plant building in a chemical plant in Philadelphia, Pennsylvania. Reflectance values were taken initially and after intervals of exposure using a 45/0 Reflectomer. The ratio of reflectance after exposure to initial reflectance was reported. Lower values indicate a dirtier surface.

TABLE 8.1

Evaluation of thermoplastic multi-staged emulsion polymer in pigmented coating for dirt pickup

| Sample | 3 | Comparative B |
|---|---|---|
| Initial | 1.000 | 1.000 |
| 3.73 months outside | 0.489 | 0.437 |
| 4.86 months outside | 0.450 | 0.397 |
| 5.70 months outside | 0.444 | 0.395 |
| 8.73 months outside | 0.45 | 0.405 | with 0.3% benzophenone (by weight, based on polymer solids) post-added

| Initial | 1.000 | 1.000 |
|---|---|---|
| 3.73 months outside | 0.852 | 0.837 |
| 4.86 months outside | 0.850 | 0.833 |
| 5.70 months outside | 0.833 | 0.823 |
| 8.73 months outside | 0.824 | 0.807 |

The comparison of Sample 3 of this invention and Comparative B, which have the same overall composition at a calculated Tg=−38° C. for the single-stage Comparative B is presented in Table 8.1. Sample 3 of this invention exhibits lower dirt pickup than Comparative B. Also, the addition of 0.3% benzophenone, by weight, based on polymer solids, substantially lowered dirt pickup; Sample 3 of this invention with added benzophenone is significantly better in dirt pickup than Comparative B with added benzophenone.

TABLE 8.2

Evaluation of thermoplastic multi-staged emulsion polymer in pigmented coating for dirt pickup

| Sample | 4 | Comparative C |
|---|---|---|
| Initial | 1.000 | 1.000 |
| 3.73 months outside | 0.573 | 0.463 |
| 4.86 months outside | 0.555 | 0.427 |
| 5.70 months outside | 0.546 | 0.420 |
| 8.73 months outside | 0.588 | 0.422 |
| 11.2 months outside | 0.596 | 0.417 |
| 15 months outside | 0.717 | 0.531 | with 0.3% benzophenone (by weight, based on polymer solids) post-added

| Initial | 1.000 | 1.000 |
|---|---|---|
| 3.73 months outside | 0.863 | 0.841 |
| 4.86 months outside | 0.873 | 0.840 |
| 5.70 months outside | 0.852 | 0.814 |
| 8 73 months outside | 0.829 | 0.805 |
| 11.2 months outside | 0.805 | 0.773 |
| 15 months outside | 0.837 | 0.781 |

The comparison of Sample 4 of this invention and Comparative C, which have the same overall composition at a calculated Tg=−34° C. for the single-stage Comparative C is presented in Table 8.2. Sample 4 of this invention exhibits lower dirt pickup than Comparative C. Also, the addition of 0.3% benzophenone, by weight, based on polymer solids, substantially lowered dirt pickup. Sample 4 of this invention with added benzophenone is significantly better in dirt pickup than Comparative C with added benzophenone.

TABLE 8.3

Evaluation of thermoplastic multi-staged emulsion polymer in pigmented coating for dirt pickup

| Sample | 5 | Comparative D | Comparative G |
|---|---|---|---|
| Initial | 1.000 | 1.000 | 1.000 |
| 0.65 months outside | 0.913 | 0.888 | 0.895 |
| 1.17 months outside | 0.856 | 0.800 | 0.822 |
| 2.17 months outside | 0.806 | 0.640 | 0.697 |
| 3.25 months outside | 0.799 | 0.561 | 0.631 | with 0.3% benzophenone (by weight, based on polymer solids) post-added

| Initial | 1.000 | 1.000 | 1.000 |
|---|---|---|---|
| 0.65 months outside | 0.949 | 0.927 | 0.950 |
| 1.17 months outside | 0.921 | 0.885 | 0.917 |
| 2.17 months outside | 0.935 | 0.884 | 0.930 |
| 3.25 months outside | 0.925 | 0.884 | 0.921 |

The comparison of Sample 5 of this invention and Comparative D, which have the same overall composition at a calculated Tg=−30° C. for the single-stage Comparative D is presented in Table 8.3. Sample 5 of this invention exhibits lower dirt pickup than Comparative D. Also, the addition of 0.3% benzophenone, by weight, based on polymer solids, substantially lowered dirt pickup. Sample 5 of this invention with added benzophenone is significantly better in dirt pickup than Comparative D with added benzophenone.

EXAMPLE 9

Outdoor Exposure Dirt Pickup Results for Multi-Staged Emulsion Polymer Binder in Pigmented Coating Incorporating a Photosensitive Compound Sample 4 and Comparative C were formulated into pigmented coatings according to the following formulation. Coated samples using pigmented coatings were prepared according to Example 6. The samples were placed horizontally, face-up on a roof of a plant building in a chemical plant in Philadelphia, Pa. Reflectance values were taken initially and after intervals of exposure using a 45/0 Reflectomer % reflectance retained values were determined. Lower values indicate a dirtier surface.

Preparation of Formulated Coatings. The following ingredients were placed in a metal can (quantities are given in grams)

| Water | 152.5 |
|---|---|
| Poly(methacrylic acid) dispersant (TAMOL 850) | 4.2 |
| Defoamer (NOPCO NXZ) | 1.9 |
| Potassium Tripolyphosphate | 1.4 |
| Titanium Dioxide (TIPURE R-960) | 70.4 |
| Calcium Carbonate (DURAMITE) | 422.2 |
| Zinc Oxide (KADOX 515) | 46.9 |

The above ingredients were mixed for 15 minutes in a high speed Cowles disperser, and the following ingredients were added with stirring.

| Emulsion Polymer (at 55% solids) | 470.6 |
|---|---|
| Coalescent (TEXANOL) | 7.0 |
| Biocide (SKANE M-8) | 2.1 |
| Defoamer (NOPCO NXZ) | 1.9 |
| Thickener premix (NATROSOL 250 MXR in ethylene glycol) | 4.2 / 24.4 |
| Ammonia (28%) | to pH = 9.0–9.5 |

TABLE 9.1

Outdoor exposure results for multi-staged emulsion polymer with and without photosensitive compound

| | Sample | | | |
|---|---|---|---|---|
| EXP. TIME | 4 | Comp. C | 4 + BP | Comp. C + BP |
| 0 months | 100.0 | 100.0 | 100.0 | 100.0 |
| 18 months | 56.8 | 41.9 | 70.6 | 62.4 |
| 24 months | 57.5 | 39.6 | 66.5 | 59.2 |
| 30 months | 59.9 | 43.4 | 64.2 | 56.5 |

Coating applied 20 mils wet; EXP. TIME=length of outdoor exposure; "+BP"=0.33% benzophenone (Adjutan 6016) by weight based on binder weight, post-added to formulation.

TABLE 9.2

Outdoor exposure results for multi-staged emulsion polymer with and without photosensitive compound

| | Sample | | | |
|---|---|---|---|---|
| EXP. TIME | 4 | Comp. C | 4 + BP | Comp. C + BP |
| 0 months | 100.0 | 100.0 | 100.0 | 100.0 |
| 18 months | 58.4 | 44.2 | 65.2 | 60.7 |
| 24 months | 59.2 | 42.3 | 63.1 | 53.2 |
| 30 months | 61.9 | 45.9 | 62.6 | 51.5 |

Coating applied 40 mils wet; EXP. TIME=length of outdoor exposure "+BP"=0.33% benzophenone (Adjutan 6016) by weight based on binder weight, post-added to formulation.

EXAMPLE 10

Dirt Pickup Results for Multi-Staged Emulsion Polymer Binder in Pigmented Coating with Photosensitive Compound Using Accelerated Testing Evaluation of sample 5 and Comparative D for dirt pickup using an accelerated dirt pickup test. Pigmented coatings were prepared according to Example 9. Photosensitive compounds were added to the formulations as follows: Adjutan 6016 as a 44% solids solution in xylene; Irgacure 651 as a 30% solution in xylene; and Irgacure 500 neat. Coatings were cast at 40 wet mils on 3 inch by 5 inch aluminum panels. Coated panels were dried at ambient conditions three days prior to testing. Then the coatings were half-covered with aluminum foil. Test panels were placed in a QUV Cabinet for 24 hours of UV irradiation; the QUV was equipped with UV-A bulbs and operated with no humidity cycle. The aluminum foil was removed and the test panels were allowed to equilibrate for at least two hours in a 77° F./55% R.H. room. The reflectance of each panel was measured using a Gardner Colorgard II Reflectometer (Gardner Neotec Division, Pacific Scientific Co.). Iron Oxide slurry was prepared by mechanically mixing a slurry of iron oxide at 56% solids content in DI water. Iron oxide slurry was brushed onto each panel and then dried for one hour at room temperature. Panels were washed under running warm tap water. With moderate pressure all excess iron oxide was wiped off with a cheesecloth pad. A fresh cheesecloth pad was used for each panel. Panels were then allowed to dry for two hours under ambient conditions and then % reflectance was measured on the exposed and unexposed areas(areas not covered and covered by the aluminum foil) using the Gardner Colorgard II Reflectometer.

TABLE 10.1

Accelerated dirt pickup results for multi-staged polymer binder with and without photosensitive compound

| | | % Reflectance Retained | |
|---|---|---|---|
| Sample | Photosensitive Cpd. | Exposed | Unexposed |
| 5 | None | 74 | 68 |
| 5 | 0.6% BP | 96 | 60 |
| 5 | 0.6% DMPAP | 81 | 67 |
| 5 | 0.6% BP/CHPK | 96 | 67 |
| Comp. D | None | 43 | 42 |
| Comp. D | 0.6% BP | 97 | 41 |

TABLE 10.1-continued

Accelerated dirt pickup results for multi-staged polymer binder with and without photosensitive compound

| | | % Reflectance Retained | |
|---|---|---|---|
| Sample | Photosensitive Cpd. | Exposed | Unexposed |
| Comp. D | 0.6% DMPAP | 61 | 51 |
| Comp. D | 0.6% BP/CHPK | 88 | 48 |

BP = Benzophenone (Adjutan 6016)
DMPAP = 2,2-dimethoxy-2-phenyl acetophenone (Irgacure 651)
BP/CHPK = 50/50, by wt. benzophenone/1-hydroxy cyclohexyl phenylketone (Irgacure 500)

When no photosensitive compound is used, sample 5 of this invention is substantially better then Comparative D for dirt pickup by an accelerated test believed to represent outdoor weathering-related dirt pickup. Compositions of this invention containing Sample 5 and a photosensitive compound exhibit superior accelerated dirt pickup.

EXAMPLE 11

Dirt Pickup Results for Multi-Staged Emulsion Polymer Binder in Pigmented Coating Incorporating a Photosensitive Compound Using Accelerated Testing Preparation of multi-staged emulsion polymer binders incorporating a photosensitive compound and evaluation for accelerated dirt pickup. Binders of the compositions listed in Table 10.1 were prepared according to the method of Example 1, with those indicated incorporating the photosensitive compound, HMPMBB. Formulated coatings were made according to Example 9 and tested according to the method of Example 10.

TABLE 11.1

Compositions of Samples used In Example 11

| Sample | Composition |
|---|---|
| 13 | Stage I: 85(91.6 BA/7 AN/1.4 AA) |
| | Stage II: 15(52 BA/43 MMA/5 MAA) |
| 14 | Stage I: 85(86.6 BA/7 AN/5 HMPMBB/1.4 AA) |
| | Stage II: 15(52 BA/3 MMA/5 MAA) |
| 15 | Stage I: 85(91.6 BA/7 AN/1.4 AA) |
| | Stage II: 15(47 BA/43 MMA/5 HMPMBB/5 MAA) |
| 16 | Stage I: 85(86.6 BA/7 AN/5 HMPMBB/1.4 AA) |
| | Stage II: 15(47 BA/43 MMA/5 HMPMBB/5 MAA) |

HMPMBB = Hydroxymethacryloxypropylmethylbenzoyl benzoate

TABLE 11.2

Accelerated Dirt Pickup for multi-staged emulsion polymer binder in pigmented coating incorporating a photosensitive compound

| | % Reflectance Retained | |
|---|---|---|
| Sample | Exposed | Unexposed |
| 13 | 38 | 35 |
| 14 | 50 | 35 |
| 15 | 41 | 39 |
| 16 | 52 | 35 |

Samples 14–16 of this invention incorporating a photosensitive compound demonstrate accelerated dirt pickup resistance better than that of Sample 13 which does not incorporate a photosensitive compound either in the copolymer or in the formulation.

What is claimed is:

1. A thermoplastic, elastomeric coating, caulking or sealant composition comprising, as the polymeric binder, an elastomeric multi-stage emulsion polymer obtained by sequentially polymerising, under emulsion polymerisation conditions, a first monomer system free from polyethylenically unsaturated monomers, and which yields a first-stage polymer having a glass transition temperature from about −30° C. to about −60° C., and a second monomer system, likewise free from polyethylenically unsaturated monomers, and which yields a second-stage polymer, incompatible with the first-stage polymer, and having a glass transition temperature from about 0° C. to about 60° C., said multi-stage polymer comprising from about 70% to about 95% by weight of the first-stage polymer and from about 5% to about 30% by weight of the second stage polymer, characterised in that the composition either contains from about 0.1 to about 5.0% by weight, based on the weight of the multistage polymer, a photosensitive benzophenone compound or phenylketone capable of absorbing light of a wavelength falling within that of the visible spectrum, or else comprises, as the said binder, said multistage polymer having incorporated therein, in one or other of the two stages of the multistage polymer, from about 0.5 to about 5.0% by weight, based on the weight of the multistage polymer, of polymerised units derived from a monomer containing a photosensitive benzophenone group.

2. A composition according to claim 1, wherein the glass transition temperature of the second stage polymer component of the multi-stage polymer used as the binder is at least about 40° C. higher than that of the first stage polymer.

3. A composition according to claim 1, wherein the composition contains as a separate photosensitive additive, benzophenone itself.

4. A composition according to claim 1, wherein the multi-stage polymer itself contains units derived from a monomer containing a photosensitive benzophenone group, those units being derived from one or more of the following monomers: vinylbenzyl methylbenzoylbenzoate, hydroxymethacryloxypropyl methylbenzoylbenzoate, hydroxymethacryloxypropyl benzoylbenzoate or hydroxymethacryloxypropoxy benzophenone.

5. A composition according to claim 1, wherein the composition additionally contains one or more of the following: a pigment, an extender, dispersant, surfactant, coalescent, wetting agent, thickener, rheology modifier, drying retarder, plasticizer, biocide, defoamer, colorant or wax.

6. A method of coating, caulking or sealing a substrate which comprises applying to the substrate a composition as claimed in claim 1.

* * * * *